Nov. 19, 1957  E. W. JAHN ET AL  2,813,316
APPARATUS FOR PRODUCING SHELL MOLDS
Filed March 5, 1953  7 Sheets-Sheet 1

INVENTORS
EARL W. JAHN
ALFRED C. QUIST
BY Chapin & Neal
ATTORNEYS

Nov. 19, 1957  E. W. JAHN ET AL  2,813,316
APPARATUS FOR PRODUCING SHELL MOLDS
Filed March 5, 1953  7 Sheets-Sheet 3

FIG.3

INVENTORS
EARL W. JAHN
ALFRED C. QUIST
BY Chapin & Neal
ATTORNEYS

Nov. 19, 1957 E. W. JAHN ET AL 2,813,316
APPARATUS FOR PRODUCING SHELL MOLDS
Filed March 5, 1953 7 Sheets-Sheet 4

INVENTORS
EARL W. JAHN
ALFRED C. QUIST
BY Chapin & Neal
ATTORNEYS

United States Patent Office 2,813,316
Patented Nov. 19, 1957

2,813,316
APPARATUS FOR PRODUCING SHELL MOLDS

Earl W. Jahn, Springfield, and Alfred C. Quist, Southwick, Mass., assignors to Production Pattern & Foundry Co., Chicopee, Mass., a corporation of Massachusetts Application March 5, 1953, Serial No. 340,622

6 Claims. (Cl. 22—20)

This invention relates to apparatus for making shells for use in the shell molding process of casting articles and particularly to a machine for automatically producing such shells.

In general a principal object of the invention is to provide apparatus for producing shells rapidly and efficiently and for eliminating guesswork in the mechanized production thereof.

Another object of the invention is to provide simplified apparatus for making shells automatically and to increase the rate of production beyond that heretofore known in the trade.

A further object of the invention is to provide a novel method of investing a shell mold pattern with the material from which the shells are made so as to eliminate defects in the formation thereof and to provide novel mechanism by which the investing method may be practiced.

Another object of the invention is to provide apparatus which may be utilized for the successive production of shells from various mold patterns without more than momentary interruption of the machine.

The above and numerous other specific objects and advantages will be apparent from the following description of an embodiment of the invention as shown in the annexed drawings.

In the drawings,

Figs. 14, a and b are a wiring diagram of the electrical mechanism for the apparatus.

Shell molds as those skilled in the trade are aware comprise a pair of oppositely faced, comparatively thin shell members, generally rectangular in shape, in each mating face of which is provided an impression received from a pattern plate to form together with its oppositely faced shell a cavity for the mold. Each shell member is separately made by coating the surface of a heated pattern plate with an investing material composed of an extremely fine, sharp, dry silica sand mixed with resin. The pattern plate with the investment material coating its surface is next placed in an oven in order to cure the sand-resin mix at the required temperature. When cured the shell is then drawn or stripped from the pattern plate to be cooled at room temperature.

The thickness of the shell members are in fractions of an inch and the cured investment material is capable of forming a sharp clear image of the pattern plate. These factors enable the manufacture of castings with dimensional stability, the maintenance of precise casting tolerances and the reduction or elimination of machining operations. Such castings have a superior finish not obtainable by ordinary sand casting procedures. The many advantages of the shell molding process of casting articles have been generally recognized by those skilled in the art. The process has not, however, been as widely used as might be desired by those for whom its advantages are at once apparent, because of the lack of satisfactory apparatus for mechanizing the manufacture of the shells and thus making the process economically feasible.

The method and apparatus of the present invention have been devised for the rapid fool-proof production of shells for the shell mold process of casting articles.

In the drawings an embodiment of the invention is shown in its preferred form having in one unified assembly, mechanism for investing the pattern plate, an oven for curing the shell material on the plate, the means for stripping a cured shell from the plate and means for performing the necessary operations in a rapid sequence. This sequence of the machine when an "automatic" cycle, will first be described in general outline with reference to Figs. 1 and 2. The various details of the mechanism for carrying out the several operations will then be described.

Figure 1:
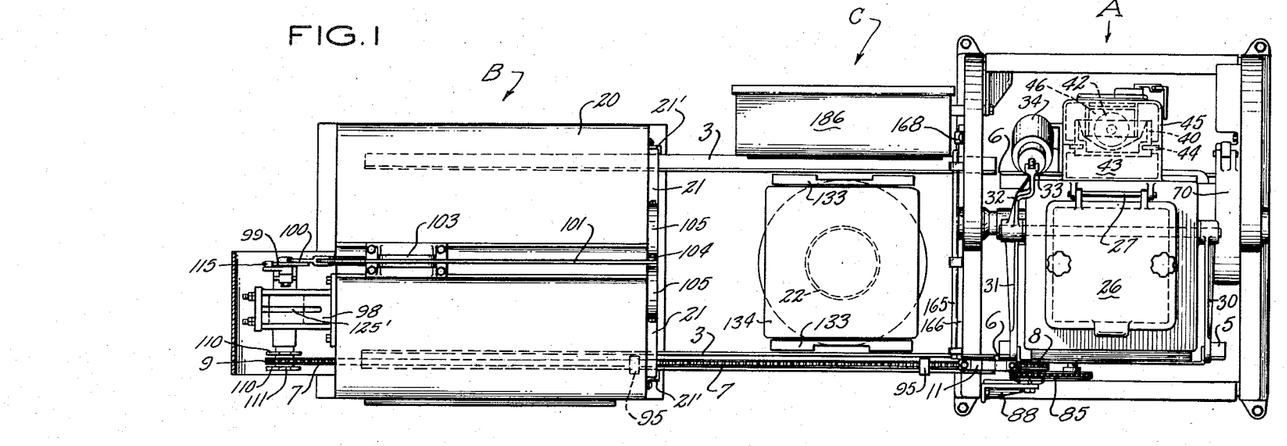
Fig. 1 is a top plan of the machine.
Figure 2:
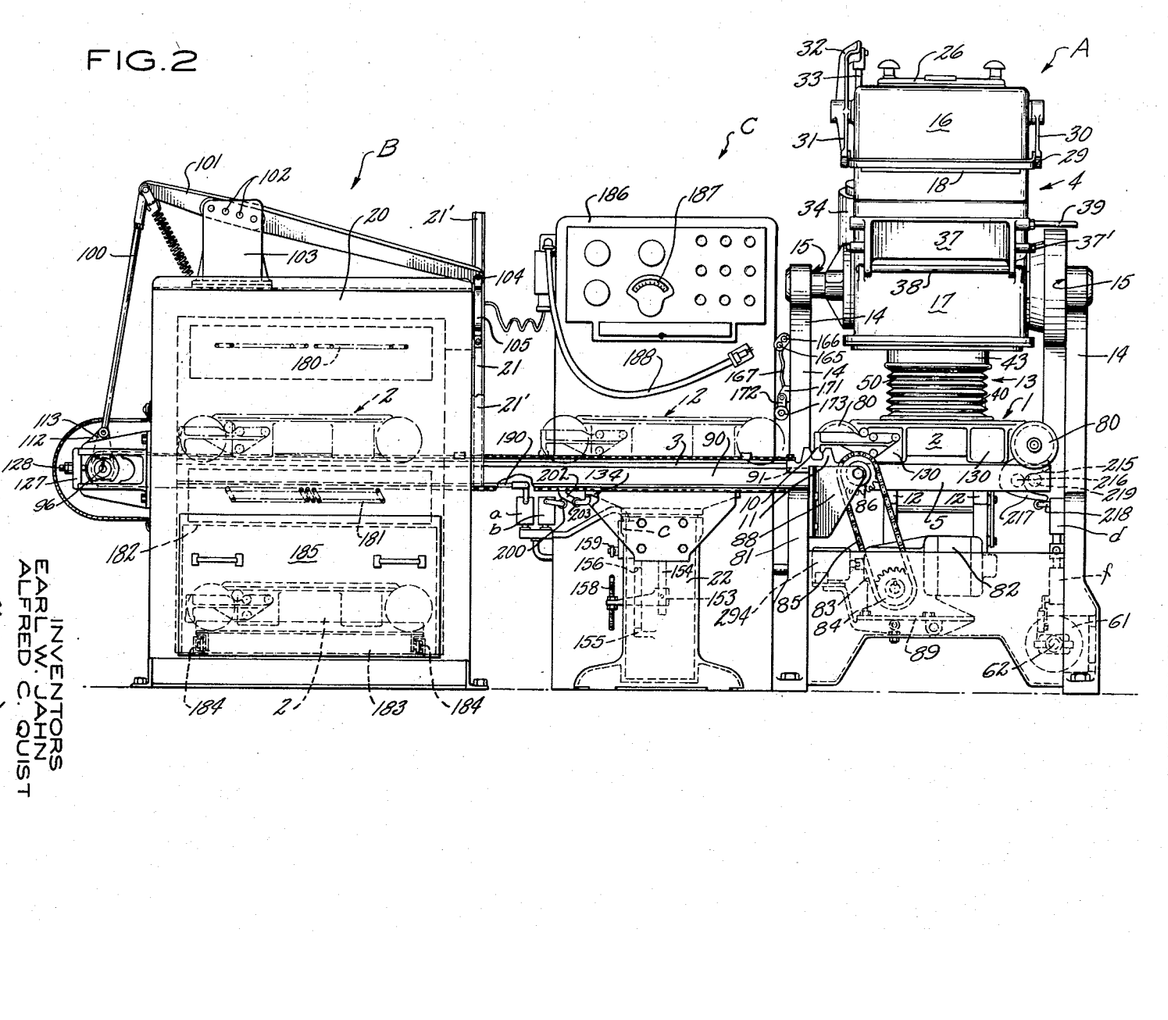
Fig. 2 is a front elevation.

In Figs. 1 and 2 three stations A, B and C are indicated. Station A is an "investment" station at the right. Station B is a "curing" station at the left. Station C is a shell "ejection" station between A and B.

A pattern as indicated by the arrow at 1 (Fig. 2) is horizontally mounted in the frame of a wheeled carriage or carrier 2 shown in full line resting at station A. Carrier 2 is mounted for horizontal wheeled movement on a track 3 which extends between stations A, B and C. Under the investing chamber 4 at station A a portion 5 of the track is separately mounted, being in end to end abutting relation as at 6 (Fig. 1) with the remainder of the track 3. An endless conveyor chain 7 for propelling the carrier from station to station is mounted adjacent the track between a sprocket 8 (at the left side of station A adjacent the juncture of track section 5 with track 3) and a sprocket 9 (at the left end of station B). The carrier 2 is propelled back and forth between the three stations by the hooked engagement of a draw bar 10 (Fig. 2) fixed on the carrier with a vertically slotted propeller fork 11 hitched to the chain 7 between the ends thereof (Fig. 1). It should be noted (Fig. 2) that the carrier 2 at station A may be raised vertically with the lug of bar 10 sliding out of engagement with the slot of the fork 11. The positions of carrier 2 at stations B and C are indicated by dot-dash lines.

The track section 5 (see Figs. 2 and 3) at station A is supported on a vertically movable table or platform formed by spaced castings 12 (joined at the front by a brace rod 12') of an elevator column 13 carried at the rear of the investment chamber 4. The platform may be raised to elevate the carriage 2 and place the pattern against the bottom of the investment chamber. The chamber 4 is journaled on bearings 15 at the top of frame posts 14 and as a unit the chamber and elevator table with the carrier in an upper clamped condition may be rotated to an inverted position as from the position of Fig. 2 to that of Fig. 4 as will be later described.

The investment chamber is divided into two compartments, an upper charging compartment 16 at the top as in Fig. 2, and below compartment 16 a lower investing compartment 17 having an open bottom framed to receive the pattern plate against the same. A gate 18, the outer edge of which is shown by Fig. 2, in the upper central section of chamber 4, separates the two compartments.

At the start of a cycle at the investment station the gate is closed with a mass of sand-resin mix held in the upper compartment 16. A pattern, pre-heated to a suitable temperature for receiving a coating of the sand-resin mix, is fixed in place at station A on carrier 2 and beneath the investing chamber 4. The cycle commences with the lifting of platform table 12 to raise the track section 5 and the carrier 2 upwardly to register the pattern plate 1 against the open bottom of the investing compartment 17.

With the plate 1 seated against the bottom of compartment 17 the gate 18 is withdrawn to drop the mass of sand-resin mix held in compartment 16 vertically into compartment 17 and onto the pattern surface. The heat of the pattern binds an adjacent layer of sand-resin mix together to form a coating of the mix adhering together and to the pattern surface. The amount of heat, and length of time the mass is permitted to remain in this position determines the thickness of the layer formed as a coating on the pattern.

Figure 4:
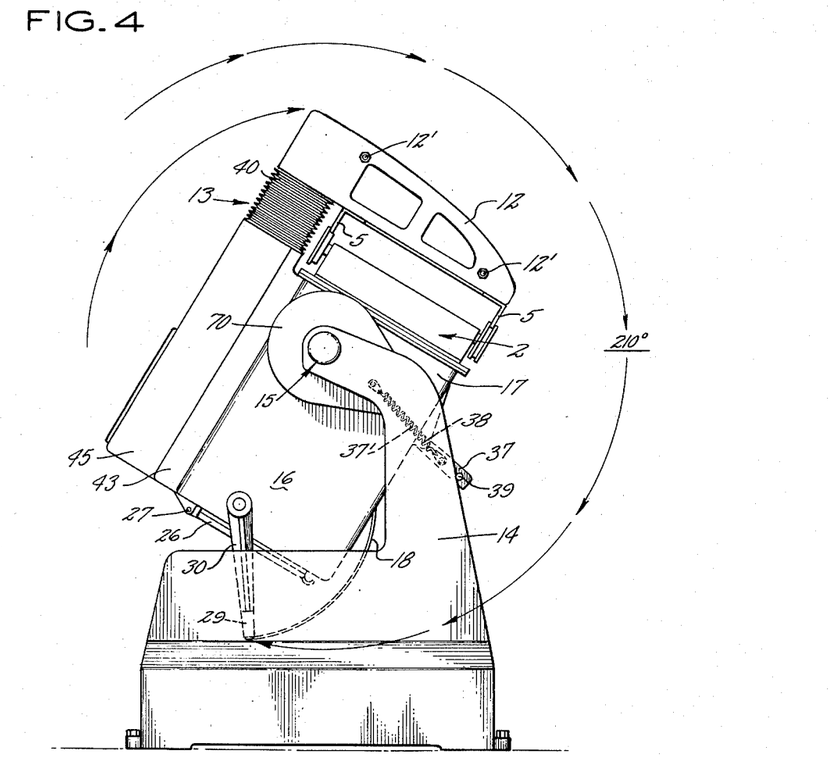
Fig. 4 is a side elevation on reduced scale at the investment end showing the investment chamber in inverted position.

An adjustable investment timer permits the formation of a suitable coating against the face of the pattern. The chamber 4 with pattern, carrier and track 5 is then rotated to an inverted position (as shown by Fig. 4) in which the excess sand and resin mix falls into the inverted upper compartment 16. The gate 18 closes, trapping the excess mix in compartment 16, and chamber 4 is then reversely rotated to its upright position.

In quick succession the elevator platform table 12 is lowered, matching track 5 with track 3, and the chain 7 is driven to propel the carrier, with the coated pattern, across to station B. As the carrier approaches the oven 20 a door 21 opens, the carrier bearing the pattern enters, the door shuts, and the curing operation of the shell continues at a prescribed temperature.

An adjustable curing timer determines the desired period for heating the layer of sand-resin mix. On completion of the curing cycle the chain is driven in a reverse direction, the door snaps open, the carrier is withdrawn with the door 21 snapping shut behind it, and the carrier is then registered at the ejection station C.

The coating of sand-resin mix has at the end of the curing cycle been heated sufficiently to cause it to become substantially rigid and self-sustaining in form. At the ejection station C the carrier 2 is positioned with the frame thereof held against vertical movement. An ejector cylinder 22 then operates to elevate a platen surface against ejection pins depending from the pattern plate and positioned with the heads of the pins on the top of the pattern against the lower surface of the cured shell. The pins lift the shell of cured mix, stripping the same from the pattern surface; the operator lifts the shell free of the carrier; the ejection pins are lowered back into the plate and a release agent is sprayed on the surface of the pattern as the carrier is propelled to the investment station A where the above described cycle is automatically repeated.

The various portions of the apparatus will now be described in detail:

*Investing mechanism*

Figure 3:
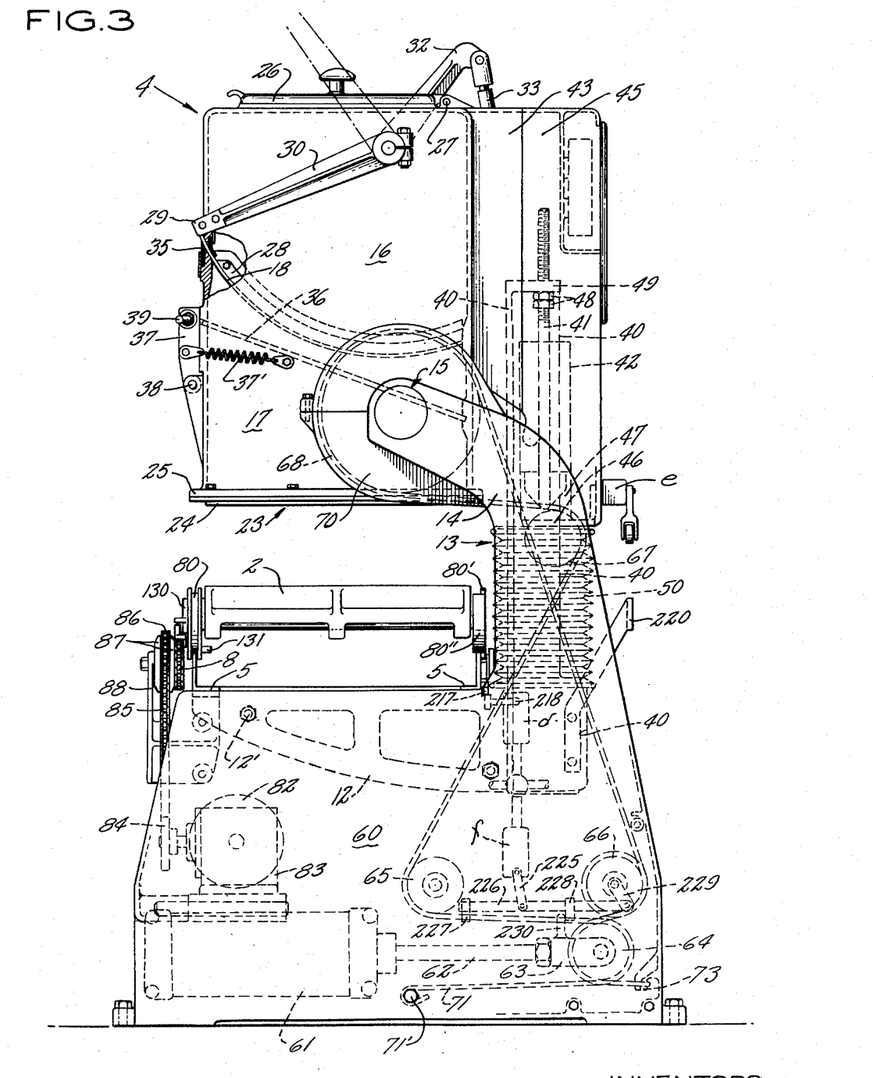
Fig. 3 is a side elevation at the investment end of the machine.

The investing chamber 4, as shown by Figs. 1, 2, and 3, is mounted between the frame posts 14 at the top thereof, being fixed on axle members journaled on the posts as at 15 and fixed at opposite sides to the lower rear central portion of the chamber 4 (see Fig. 3). The opening (Fig. 3) in the bottom of the investing compartment 17 is indicated by the arrow 23 and is framed by an adapter 24 suitably bolted to an adapter rim plate 25 so as to provide an opening appropriate to the dimensions of the pattern plate and size of shell desired.

As previously noted the sand-resin mix is held initially in the upper compartment 16. A door 26 in the top wall of the compartment 16 is hinged at 27 for replenishing the supply of investment material in the compartment. Additional material may be supplied whenever the chamber is idle during the shell curing stage and without interruption of the continuous cycle of operations.

The gate 18 as shown by Fig. 3 divides the chamber into the compartments 16 and 17, the gate being an arcuately shaped apron the edges of which are slidably held at each inner side wall by suitable guideway structure as at 28. Across the outer edge of the gate is fixed a strap 29 extending laterally of the sides of the chamber and attached to the outer ends of lever arms 30 and 31. The arms are pivoted adjacent the upper rear portion of the side walls of the chamber. Arm 31 is also formed with an upwardly angled and inwardly offset bell crank end 32 (see Fig. 1) to the outer end of which is pivoted a piston rod 33 of a cylinder 34 bracketed at the adjacent edge portion of the rear wall of the chamber 4. The piston rod 33 in extended position holds the gate 18 in closed position. When pulled downwardly the arms 30 and 31 are pivotally cranked to the position shown in dot-dash lines of Figs. 3 and 4, thus withdrawing the gate 18 from the chamber through the louvered opening at 35.

Below the gate 18 (Fig. 3) in compartment 17 a wire mesh screen 36 may be placed. The screen is inclined upwardly towards the front wall of the compartment. Immediately below the upper edge of the screen in the front wall is the top of a door 37 hinged at its lower edge on a pintle 38 bracketed across the front wall. The door is normally held in closed position by a spring 37' fixed to the chamber side wall and to the edge of the door above the pintle. At the top end edge of the door 37 is a pin 39 extending outwardly of the side wall of the chamber for pivoting the door to open position when the chamber is inverted as will be described. When the gate 18 is withdrawn the mix falls freely through the screen into the bottom of compartment 17 against the pattern surface. When the chamber 4 is inverted as shown by Fig. 4 the door 37 is opened by contact of the pin 39 against the adjacent post 14 and any uncured lumps in the excess mix are caught (on return of the mix to the compartment 16) by the screen 36 to fall from the chamber through the door 37.

The mechanism for elevating the table 12 into position for clamping the pattern on the carriage 2 against the framed opening of the bottom wall is shown by Figs. 1 and 3. The table 12 is seen as a forwardly extending base structure comprising the pair of spaced castings 12 fixed to the lower end of a channel column 40 of the elevator 13. The column is raised vertically by means of a pressure operated piston rod 41 of a cylinder 42. The cylinder and column are housed (Fig. 1) in a U-shaped column support 43 integral with the rear wall of the chamber 4, with gibs at 44 forming the guideway structure for the column 40, and an oppositely facing U-shaped outer housing support 45 suitably affixed to the support 43.

Cylinder 42 is supported on a horizontal pad of hanger bracket member 46 fixed at the lower end of the outer housing support 45 (Fig. 3). The cylinder is vertically disposed with the piston rod 41 of piston 47 extending upwardly and provided with adjustable nuts 48 forming a seat for a horizontal lifter plate 49 extending as a web at right angles from the top of column 40. Between the cylinder and base of the column is a protective dust cover for the column as bellows 50. It will readily be seen that pressure applied at the lower end of piston 47 will raise the rod and column 40 upwardly to elevate the table 12 to clamp a pattern on the carrier 2 against the base of chamber 4.

Figures 9, 10, 11, 12, 13:
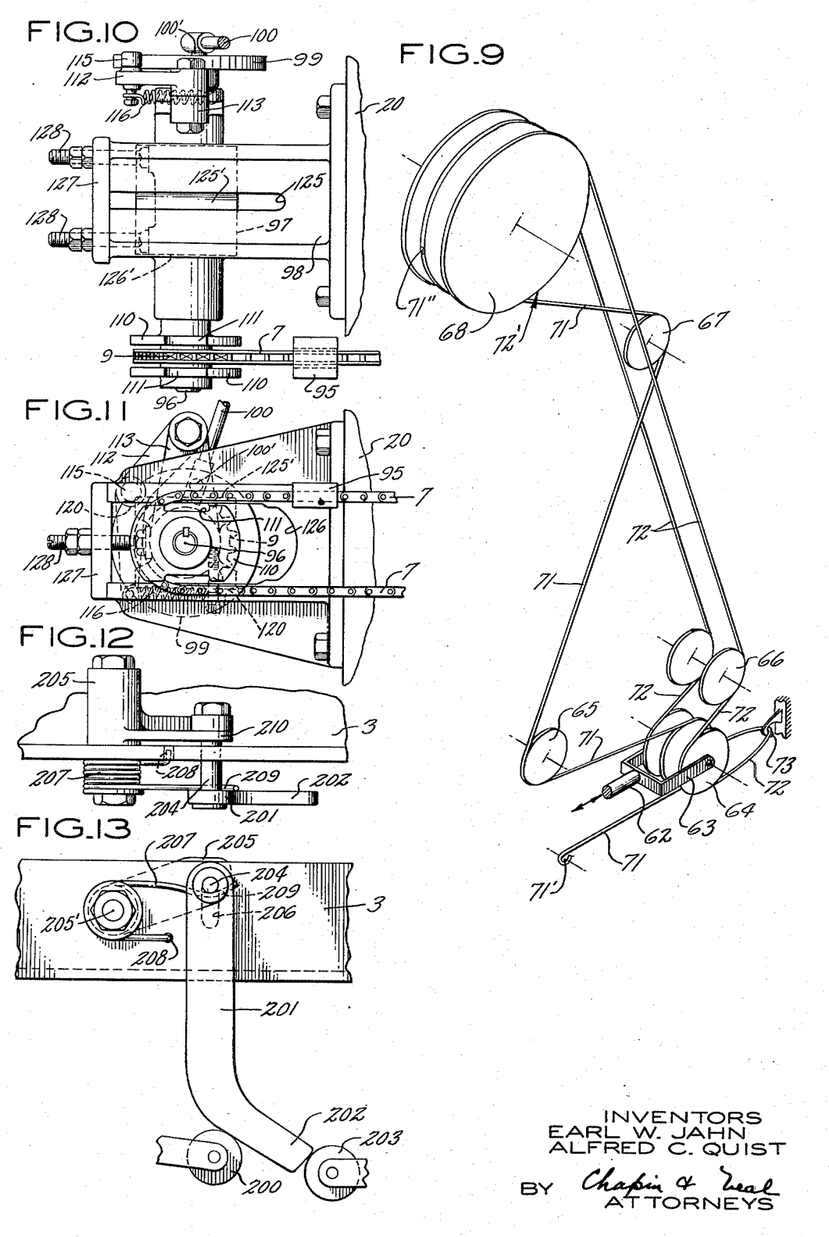
Fig. 9 is a schematic drawing to illustrate the means for rotation of the investment chamber to the positions as shown by Figs. 3 and 4.
Fig. 10 is a top plan of mechanism for opening and closing the door of the curing oven.
Fig. 11 is a side elevation of the mechanism shown by Fig. 10.
Fig. 12 is a detail plan view of the actuating mechanism for the operation of limit switches at the ejection station.
Fig. 13 is a side elevation of the mechanism of Fig. 12.

In Fig. 3 the mechanism for inverting the chamber 4 and parts associated therewith is shown as a cable and sheave arrangement (see also Fig. 9). In the base of the pedestal against the outer side wall 60, from which the outer frame post 14 extends, a cylinder 61 is mounted with a piston rod 62 extending towards the rear wall of the base. Rotatably mounted on the end of the piston in a yoke 63 is a driving pulley 64 having a triple grooved edge. Above the sheave 64 and rotatably mounted on pins fixed on the wall 60 beyond the extreme inner and outer positions of sheave 64 are guide sheaves 65 (having a single groove in its edge) and 66 (having a double grooved edge). Above the latter sheaves a third guide sheave 67 (with a single groved edge) is mounted in the frame post 14. A driven wheel 68 is keyed to the axle shaft member journaled at 15 and by which the adjacent side of the chamber 4 is pivotally mounted. The wheel 68 is provided with a triple grooved edge and is encased in a split-cap wheel cover housing 70 inwardly adjacent the post 14.

A wire cable 71 (Fig. 9) is fixed at one end at 71' below the piston rod and rearwardly of the retracted position of the pulley 64, is looped around the forward side of pulley 64 in the center groove thereof and rearwardly looped around the front edge of guide sheave 65. From sheave 65 the cable is directed upwardly and rearwardly to be passed around the rear side of guide sheave 67 from which it is passed forwardly and around the wheel 68 from underneath the same. The other end of cable 71 is suitably anchored to the wheel as at 71''.

A second cable 72 is provided with a double run being looped centrally and hooked in the loop at 73 to the base of the pedestal forwardly of the extended position of pulley 64. The two cable sections are then looped around the back side of the pulley 64, turned around the sheave 66 and directed upwardly to pass forwardly around the top of wheel 68. On pulley 64 and wheel 68 the sections of cable 72 are lodged in the outer grooves thereof. The ends of cable 72 are anchored on the wheel in the relative position indicated by the arrow 72'. The double run of cable 72 and single run of cable 71 with the latter centrally positioned on pulley 64 and wheel 68 insure against a twisting action thereon as either cable is pulled to rotate the wheel 68.

It will be readily seen that when the piston rod pulls the driving pulley 64 from extended position to retracted position that the cable 72 will be drawn around sheave 66 to pull the wheel 68 in a clockwise direction as in Figs. 3 and 9 and to rotate the chamber 4 similarly to its inverted position. The length of piston travel of course determines the extent of wheel rotation and in the present device the chamber is adapted for rotation of approximately 210°. When the pulley 64 is reversely driven to its outer extended position the wheel 68 is rotated by the cable 71 being drawn around sheave 67 and sheave 65 and in a counterclockwise direction, thus causing the return of chamber 4 to its upright position.

*Conveyor mechanism*

Referring to Figs. 1 and 2 the carrier 2 has grooved wheels 80 riding on the outer rail (Fig. 1) of the track 3. As will be later described only one of the wheels riding on the inner rail is flanged. The rails are in the form of angle irons with section 5 of the track suitably fixed to the table 12 of the elevator 13 and having its vertical flange aligned in lowered position with the rails of track 3. The rails of track 3 are provided with the base flanges thereof extending outwardly and are mounted at one end on the inner side wall 81 of the investment chamber pedestal, centrally on the frame structure of the ejection cylinder 22, and at the other end in the wall frame structure of the oven 20.

As seen in Fig. 2 the chain 7 is supported adjacent the path of the front rail of the track along the outer side thereof riding on a guide rail 90 suitably fixed as by spacer bolts to the rail 3 between the sprockets 8 and 9. The chain is driven by a reversible motor 82 (Figs. 2 and 9) operating through a gear box 83 with a right angle drive to rotate a drive sprocket 84 of a primary drive chain 85. The chain 85 drives a sprocket 86 having a friction clutch connection for driving the sprocket 8. The sprockets 86 and 8 are mounted on a bracket 88 fixed to the pedestal wall 81 as best shown by Fig. 2. The drive as described between sprocket 86 and sprocket 8 is preferably a friction clutch drive as indicated by the plates at 87 (Fig. 3). An adjustment for proper tension of the chain 85 is provided by the pivotal mounting of a deck 89 on which the motor and gearing are carried.

As previously mentioned the fork propeller 11 (Figs. 1 and 2) is bolted to the chain at each end thereof with the vertically slotted fork extending, in the rest position of the chain adjacent sprocket 8 in overlapping relation to the track section 5. Thus the carrier is propelled into this position at the investment station into registration with track 5 for its elevation against the chamber 4.

The upper run of chain 7 is preferably supported over the guide rail 90 (Fig. 2) with the fork 11 also riding on this rail in the grooved slot provided in its underside as at 91. Thus the fork is supported at all times throughout its travel for positively engaging the lug of the draw bar 10 of the pattern carriage.

Also on the upper run of the chain 7 as in Fig. 1 are two lugs 95 spaced from the propeller fork and fastened to the chain to project at the sides thereof for opening and closing the door of the oven as the carrier 2 goes in and out of the same. In Figs. 10 and 11 the sprocket 9 is shown mounted for the free rotation thereof on a shaft 96 carried in a bearing block 97 of a bracket 98 fixed to the rear wall of the oven 20.

Centrally of the oven the rearward end of the shaft 96 carries a crank wheel 99 keyed thereto and to which the lower end of a crank arm 100 is eccentrically pivoted as at 100'. The upper end of the arm 100 (Fig. 2) is pivoted to the outer end of an oven door lever 101 which is adjustably fulcrumed on a pin set in one of a series of openings 102 in a fulcrum plate 103 mounted on the roof of the oven. At its other end the lever is provided with a pivotal connection 104 at the top of forked lifter arms as at 105 (see Fig. 1) fixed to the top of the door 21. Door 21 as shown in Fig. 2 rides at each side edge in channel tracks 21'.

It will be seen that as the arm 100 is cranked downwardly the vertical opening of the door may be adjusted for different elevations by the positioning of the fulcrum pin in the different openings of fulcrum plate 103. This enables the adjustment of the door to allow just the proper amount of clearance underneath the door for the passage of the carrier 2 with pattern plates of various vertical dimensions.

The arm 100 is cranked to open the door by the rotation of the wheel 99 for 180° and to close the door by a further rotation of 180°. The wheel is cranked in one direction to open and close the door for passage of the pattern into the oven and cranked in the reverse direction to open and close the door for passage out of the oven. On the shaft 96 and keyed thereto on each side of sprocket 9 is a wheel 110 having diametrically opposed lug notches 111 adapted to receive the lugs 95 as the latter are brought into registration therewith by the chain 7. The lug 95 spaced the greater distance from the propeller fork 11 is adapted to turn the wheel 110 for 180° by hitting the rearward edge of upper notch 111 and then slipping past said edge when the notch is rotated to the lower side of the wheel 110 and the chain falls away from the same. Thus the eccentric pivot at 100' is swung to a lowered position to open the door.

To aid in registering the wheels 99 and 110 for each turn of 180° a detent arm 112, pivoted on a post 113 at the top of the bearing block 97, carries a detent roll 115 at its lower end. A spring 116 is hooked to the lower end of the arm and to the bottom of the bearing block to yieldably hold the roll 115 against the edge surface of the crank wheel 99. Roll 115 is thus seated in one of a pair of diametrically opposed recesses 120 cut in said edge surface. As the lug 95 causes the crank wheel 99 to turn, the roller is cammed out of one notch 120 to ride into the other notch 120 as the lug 95 is entering the lower run of the chain 7 and falling away from its notch 111 of wheel 110. Thus the crank arm 100 is lowered to open the door.

The second lug 95 adjacent the fork 111 likewise rotates the crank wheel 99 for 180° to raise the crank arm 100 and close the door. It will be noted that the lugs 95 (Fig. 1) are spaced on the chain first to cause the door to be raised as the fork approaches the door 21 and next to lower the door as the end of the carrier 2 has passed by the same for stopping in the oven. It will also be seen that when the chain 7 reverses its direction the lug 95 nearer the fork 11 will immediately strike the rearward edge of notch 111 on the under side of the wheel 110 in returning to the upper run of the chain and thus reversely rotate the shaft 96 and crank wheel 99. Accordingly the door 21 is first opened and then closed as the carrier 2 is moved by the chain out of the oven and the return of the other lug 95 to the upper run of the chain is accompanied by actuation of the wheel 99 for a further rotation of 180°.

The bearing block 97 is formed for slidable adjustment toward and away from the oven to adjust the tension of chain 7. A slot at 125 (Fig. 10) and a slot at 126 (Fig. 11) are respectively provided in the top and bottom and in the sides of bracket 98 to receive bosses of the bearing block as indicated at 125' (Fig. 11) and 126' (Fig. 10). Against the end of the bracket an end plate 127 receives adjustable mounting bolts 128 for securing the bearing block in the appropriate position desired on the bracket.

*Pattern and ejection and stripping mechanism*

Figure 5:
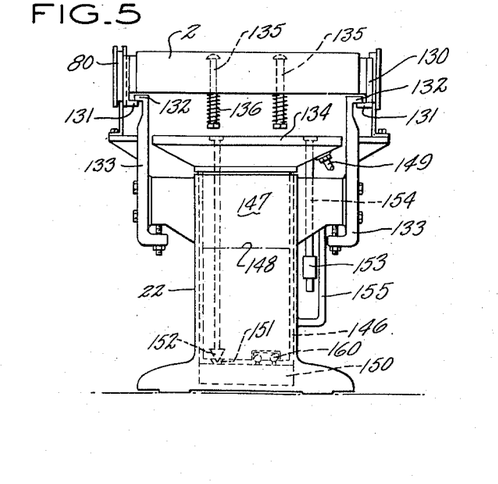
Fig. 5 is a side elevation at the shell ejection station showing the means for stripping a shell from the pattern.

In Fig. 2 on the carrier 2 spaced brackets 130 are shown attached to the side walls of the carrier adjacent each wheel. The brackets as shown by Fig. 5 are provided with inwardly projecting right angled flanges 131 at the base thereof below the side walls. At the ejection station the flanges 131 travel under flanges 132 of hold down brackets 133 bracketed to the cylinder at the front and back thereof.

The carrier 2 is thus held above the cylinder 22 against vertical movement by the interlocked engagement of the flanges 131 and 132. The ejection cylinder is a relatively large diameter pneumatically operated oil pressure type with a long bearing to provide positive square ejection of the shell from the pattern. At the top of the cylinder is a vertically movable rectangular platen 134. It is of a size to accommodate any pattern adapted for the carriage 2.

Carriage 2 is registered on its return from the curing oven at the ejection station C as will be later explained. The platen 134 is raised as shown by the detail of Fig. 5 for the platen surface to press the lower ends of ejection pins 135 against springs 136 which normally hold the rounded heads thereof on the upper surface of the pattern plate (see also Fig. 7). The pins are in the form of ordinary carriage bolts and are located in a particular pattern plate where desired to accomplish the proper drawing of the shell therefrom. As will be understood the pins are normally spaced along the sides of the projecting portions of the pattern image and are mounted with clearances provided in the holes supporting the same. The height of the platen stroke may be suitably adjusted and is checked when the shell is fully stripped from the pattern. It is then manually lifted off the carrier by the operator in the only routine manual operation during the automatic cycle of the apparatus.

Figure 7:
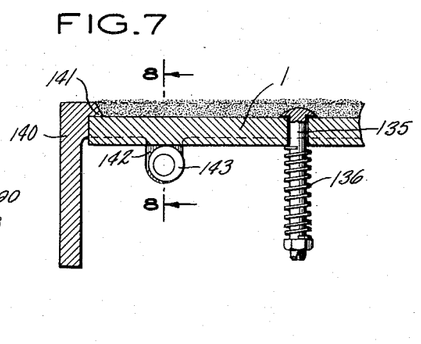
Fig. 7 is a fragmentary section showing detail of a preferred mounting for the pattern on the pattern carriage.
Figure 8:
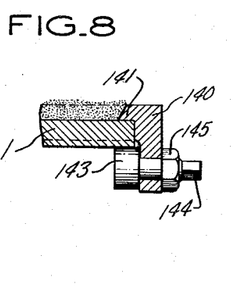
Fig. 8 is a view on line 8—8 of Fig. 7.

As also shown by Fig. 7 the pattern 1 is preferably mounted in the carriage 2 from underneath the same. The sides of the carrier as at 140 may be formed with a top lip 141 providing a seat against which the pattern edge may be set when the carriage is inverted for mounting in the same. Cam brackets as at 142 are appropriately spaced along the four sides of the carrier and, as shown by Figs. 7 and 8, an eccentric cam 143 may be mounted in the hole of the bracket from the inside. The stem 144 projecting at the outer side of the bracket is provided with a threaded nut 145 and is then turned by an appropriate tool to wedge the pattern for a secure fit against the carrier lip 141. Nut 145 is then threaded tightly on the stem to draw the eccentric against the mounting bracket and anchor the cam in place. The carriage is then ready for use. The pattern may, of course, be otherwise secured on the carrier as desired.

When the shell is stripped the pressure on cylinder 22 is released and the platen is lowered. The pattern is then conveyed towards station A and a spray directs a pattern release agent on the surface thereof as it enters the investment station for repeating the investment cycle of operation.

As shown by Fig. 5 the platen 134 is preferably operated by an air-draulic system. It is mounted on the top of a cylinder 146 slidable in the cylinder pedestal 22. The cylinder 146 provides an interior chamber 147 in which an oil level is maintained as indicated at 148. An air pressure line to the chamber 147 is provided at the top thereof by the inlet at 149. When pressure is supplied from a suitable source to the chamber 147 the oil is forced into the chamber 150 below the cylinder 146 through a passage 151 having an adjustable valve 152 for restricting the flow therethrough and thus the speed of elevation. As the oil is forced into chamber 150 the cylinder 146 is lifted to raise the platen and elevate the pins 135. The cured shell is thus stripped from the pattern surface.

The stroke of the platen is adjusted by the mounting of a stop arm member 153 fixed on the lower end of a stem 154 mounted to rise with the platen outside the cylinder 22. The stop arm 153 (see also Fig. 2) is carried in the vertical slot of a bracket 155 fixed at the side of the cylinder 22 and provided with an upper abutment at 156 so as to limit the upward thrust of the platen.

The stop arm 153, as shown by Fig. 2, also carries at its outer end a threaded vertical stem 158. The top of stem 158 is adapted to strike the arm 159 of a limit switch which as will be later described is actuated to release the air pressure entering the chamber 147. The air pressure is then permitted to exhaust back through the line 149.

Again referring to Fig. 5, on the release of the inlet pressure against the oil reservoir the air expands in the chamber to raise the platen for approximately the final inch of upward thrust until the stop 153 contacts the abutment 156 at the upper end of the slot.

As the pressure of the air in chamber 147 is exhausted back into line 149 the oil is returned to chamber 147 from chamber 150 through the check valves at 160 thus allowing the platen to fall to its lower position.

As previously stated the carrier is then moved to station A. The spray for the release agent as shown by Fig. 2 at 165 is located above the track over the path of the pattern carrier. It is held by a rod 166 bracketed to the post 14 as at 168 as shown by Fig. 1. The feed line 167 for the spray tube at 165 is connected to a suitable valved source which may be operated by an actuator arm 172 of a rod supported by a bracket 171 fixed to the post 14. The arm 172 carries a wheel 173 engageable by the top edge of the carrier side wall as it passes into the investment station A. As the wheel rides on the edge of the carrier the arm 172 is swung to the right as in Fig. 2 to actuate the spray until the wheel is released. When the arm is reversely swung to the left by passage of the carrier from the investment station the spray remains inactive.

Curing oven

The structure of the oven may be of any suitable type with heaters appropriately placed to cure the shell as desired. In Fig. 2 at 180 is shown an upper bank of heaters preferably of an electric infra-red radiant type. A lower bank of similar heaters at 181 may be provided to maintain the desired pattern body temperature. The lower bank may further be used to supply a source of heat for a pre-heating chamber 182 in the lower part of the oven and in which a standby pattern may be raised to the desired temperature on a second carriage 2. As shown a carrier is mounted on a wheeled platform 183 mounted on tracks 184. A door 185 provides access to the pre-heat chamber. The standby pattern and carrier can thus replace the carrier on the track for continued production of shell molds by stopping the machine momentarily, removing the carrier with its pattern, and depositing the second carrier on the track.

Limit switches

The mechanism for control of the various functioning parts of the apparatus are chiefly electrical as will be explained. At the ejection station C behind the cylinder is a control panel 186 in the rear of which is housed the various wiring circuits and connections. On the front of the panel are located the timing controls and manual switches for automatic operation of the machine or for the individual operation of various parts thereof as will be described.

The electrical circuits are actuated by various limit switches responding to the movement of the carrier to control the sequence of operations and these limit switches will be first described in relation to their position on the machine and the manner in which the switches are actuated on automatic cycle.

Referring first to Fig. 2 adjacent the inner rail of track 3 at the left side of the ejection station at C are located two limit switches a and b.

Figure 6:
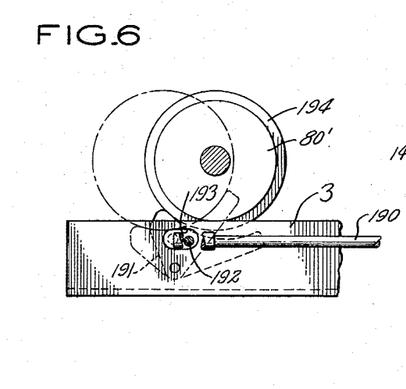
Fig. 6 is a fragmentary detail view of limit switch actuating means for instituting the curing cycle of the oven heaters.

Switch a is mounted at the inside of the inner rail 3 and is adapted to stop the movement of chain 7 as the carriage 2 is brought into position in the oven. It also actuates the oven timing cycle for curing a shell in the oven. A link 190 (Fig. 2) is connected at one end to the arm of switch a and extends along the inside of the inner rail 3 to the end thereof adjacent the rear wall of the oven. As shown by Fig. 6, the other end of link 190 is pivoted on the outer end of a pin 192 mounted on a bell crank lever or rocker 191. Rocker 191 is pivoted below pin 192 to the vertical wall of the rail 3 at the outer side thereof and a slot at 193 is provided for lateral movement of the pin 192. The forward pattern carriage wheel as 80' riding on the inner rail is formed with a flange 194 on the outer side thereof for engagement with the rocker as shown. As the flange rides against the upper arcuate edge of the rocker the latter is rocked rearwardly as to the left in Fig. 6 to draw the link 190 to the rear and actuate the switch a. Switch a as mentioned stops the carriage travel and commences the oven timing cycle.

When the curing cycle is completed the chain 7 will be reversely driven to carry the pattern out of the oven. Flange 194 is then (as in the dot-dash lines) cradled against the back of the forward arm of the rocker and thus rocks the lever to return the link 190 to its inactive position as the wheel 80' rolls to the right as in Fig. 6.

As previously described the oven door opens and closes as the pattern is carried to the ejection station C for stripping the shell therefrom. As the pattern carriage enters the ejection station a limit switch b (Fig. 2) is actuated by the mechanism shown in the detail views of Figs. 12 and 13.

Limit switch b is also mounted at the inside of the inner rail 3 and is adapted to stop the travel of chain 7 and to register the carriage above the platen 134 of the ejection cylinder. Switch b is also adapted to admit pressure to the cylinder chamber for elevating the platen as described in connection with Fig. 5.

It will be noted from Fig. 2 that the arm 200 of switch b is mounted horizontally with its roller end disposed at the side thereof for contact by a switch lever 201. Lever 201 (Figs. 12 and 13) is provided with an angled foot 202 at its lower end the heel of which in inactive position hangs against the outer end of switch arm 200 preferably having a touching contact therewith. The toe of the foot 202 is in contact with a roller abutment 203 fixed (Fig. 2) to the outer underneath edge of the platen 134. As will be presently explained lever 201 is pivotally suspended and adapted to be moved downwardly by the arrival of a carriage at the ejection station. In its downward travel the heel of the lever is lowered to actuate the switch arm 200. Being pivotally hung the lever initially tends to swing away from the roller of arm 200 but is prevented from doing so by the engagement of its toe against the abutment 203. As the downward travel of the lever is completed the toe of foot 202 passes underneath the roller abutment 203 whereupon the switch b is actuated to stop the pattern carriage and cause the ejection cylinder to raise the platen and carry the abutment 203 above foot 202.

As previously explained in connection with Fig. 5 and Fig. 2 the platen stroke in its upward direction is stopped by the engagement of the stem 158 against the arm 159 of a switch, limit switch c, thus actuating the same to cause lowering of the platen when the shell is stripped from its pattern plate.

It will be understood from Fig. 13 that the switch arm 200 of switch b, when the abutment 203 has been carried upwardly, will return to its normal horizontal position and swing the lever 201 outwardly on its pivot to place the foot 202 in the return path of downward travel of abutment roller 203. Thus when the platen is lowered to its inactive position the roller 203 will strike the upper edge of the toe of foot 202 and cause it to swing against the arm 200 again and actuate switch b a second time. As will be further explained in detail actuating switch b at this time results in energizing the motor for driving chain 7 and conveying the pattern carriage to the investment station A.

As the carriage is moved from the ejection station as to the right in Fig. 2 the lever 201 is returned to its inactive upper portion. It is to be noted further that on reversely propelling the carriage from the investment station A to the curing station B across the ejection station C (as to the left in Fig. 2) that the lever 201 will again be lowered to strike the arm 200 of switch b. On such return travel however, the circuits to switch b are not energized and the tripping of the switch is ineffective.

Referring to Figs. 12 and 13 the lever 201 is shown pivotally hung at its upper end on the outer end of a pin 204 fixed to the end of a trip arm 205 pivotally mounted on the vertical flange wall of the rail 3. The pin 204 extends through an elongated slot 206 providing vertical movement for the same and the lever 201. The shaft 205' on which the trip arm 205 is mounted extends through to the inner side of the wall of rail 3 and wound on the inner side of the shaft is a coiled spring 207. One end of spring 207 is keyed in an opening in the rail at 208 and the other end at 209 extends to lie against the underside of the pin 204 carrying the lever. Thus the lever and arm 205 are yieldably spring pressed to their upward position with the pin against the top of the slot 206. On the upper surface of the arm 205 adjacent the top edge of the rail 3 is a rib 210 on which the flange 194 of wheel 80' (Fig. 6) will be adapted to ride. From Fig. 13 it will be realized that a flange 194 in rolling on the top of rib 210 will depress trip arm 205 and effect the lowering of lever 201 against spring 207.

It will be realized from the above description of the actuator mechanism to trip switches a and b and a consideration of Fig. 2 that the wheel 80' of the pattern carriage, provided with flange 194 as in Fig. 6 to ride on the inner rail, is in the travel of the carriage to the left the leading wheel at the inner side of the carriage and in travel to the right the trailing wheel. The outer wheels 80 as have been noted are grooved for engaging the outer rail. The remaining inner wheel on the right hand side as in Fig. 2 is not flanged. Thus in moving from the oven to the ejection station C it will travel past the trip arm 205 for the engagement of the latter by flange 194 of the trailing wheel.

The limit switch d for stopping the carrier at the investment station is actuated by the remaining wheel 80'' shown in end edge view by Fig. 3. As best shown by Fig. 2 wheel 80'' is adapted to trip switch d by riding on the upper arcuately cradled surface of a rocker 215 pivoted as at 216 on the vertical wall of the inner rail of track section 5. Rocker 215 is formed with a lower extension 217 for pivoting against the arm 218 of switch d the latter being mounted on the side wall 60 of the investing structure. The extension 217 is shown by Fig. 2 in its active position operating switch d. It will be appreciated that on moving away from the position shown the carriage wheel will roll the rocker 215 to raise the extension 217 above the switch arm 218. The rocker is weighted on the side opposite the extension 217 so that when in inactive position the extension remains in its upper position. A stop 219 is provided on the rail to limit the upward swing of extension 217.

Switch d is adapted to stop movement of chain 7 to register the carriage below the investment chamber 4. It is also adapted to cause operation of the piston cylinder 42 to elevate and clamp the pattern and carriage against the bottom of the chamber.

In the raised position of the elevator table 12 a limit switch e is actuated. Switch e is mounted on the elevator column housing support 45 immediately above the bellows 50 (Fig. 3). It is actuated by a bar 220 affixed on the base of the column 40 and extending therefrom to strike the arm of switch e in the upper position of the column.

Switch e when operated feeds air pressure to cylinder 34 operating the gate 18 to drop the mass of sand resin mix onto the surface of the pattern when in clamped position. Switch e also starts an investment timer for partially setting the mix and forming an unripened shell on the pattern plate prior to inverting the chamber. At the conclusion of the investment timing cycle the cylinder 61 is then actuated to retract its piston rod 62 and invert the chamber 4.

As is also shown by Fig. 3 retraction of piston rod 62 operates a limit switch f.

Limit switch f is mounted against the inner side of wall 60 and is provided with the arm 225 thereof pivotally linked at its outer end to a reciprocable swing bar 226. Bar 226 carries fixed thereon in spaced relation at each side of arm 225 two depending lugs 227 and 228. In the manner of a parallel link with arm 225 a link 229 is pivoted on the wall 60 with its lower end pivoted to an outer end of bar 226. At the top of the yoke 63 of the driving pulley 64 is fixed an upstanding post 230 adapted to engage the lugs 227 and 228 in its path of travel when retracted and extended by operation of cylinder 61. Thus when retracted the piston rod swings bar 226 to the left as in Fig. 3 by the contact of post 230 against lug 227. This, as shown, will occur at the end of the inward stroke of the piston and actuate limit switch f when the investment chamber 4 has been inverted to the position of Fig. 4.

Switch f operates at this time to close the gate 18 to trap the excess sand-resin mix in the upper compartment. It also admits pressure to the other end of cylinder 61 to extend the piston rod and return chamber 4 to upright position.

On return of the piston to its extended position the post 230 engages lug 228 to actuate switch f a second time at the end of its outward stroke. Switch f then operates to allow the clamping cylinder 42 to exhaust and the weight of the pattern, carriage and track section 5 lowers the elevator to the position shown by Figs. 2 and 3.

It will be realized that returning track section 5 to its lower position again causes the extension 217 (Fig. 2) to strike limit switch d. On being actuated at this time switch d energizes the motor to drive chain 7 and convey the carriage from the investment station A to the oven at curing station B. Limit switch b as will be described is taken out of circuit by switch d so that when wheel 80' actuates the trip arm 205, as described in connection with Figs. 12 and 13, switch b will remain inactive.

Electrical sequence operation

Figure 14A:
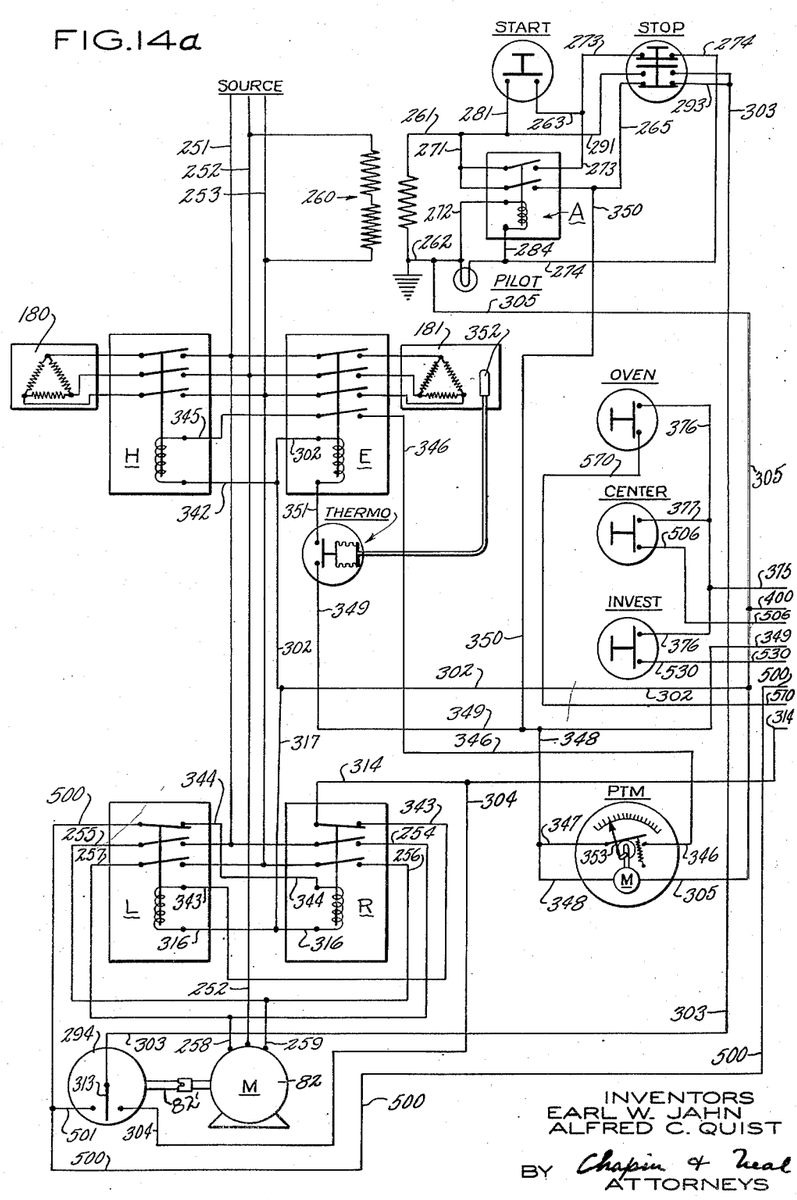
Figure 14B:
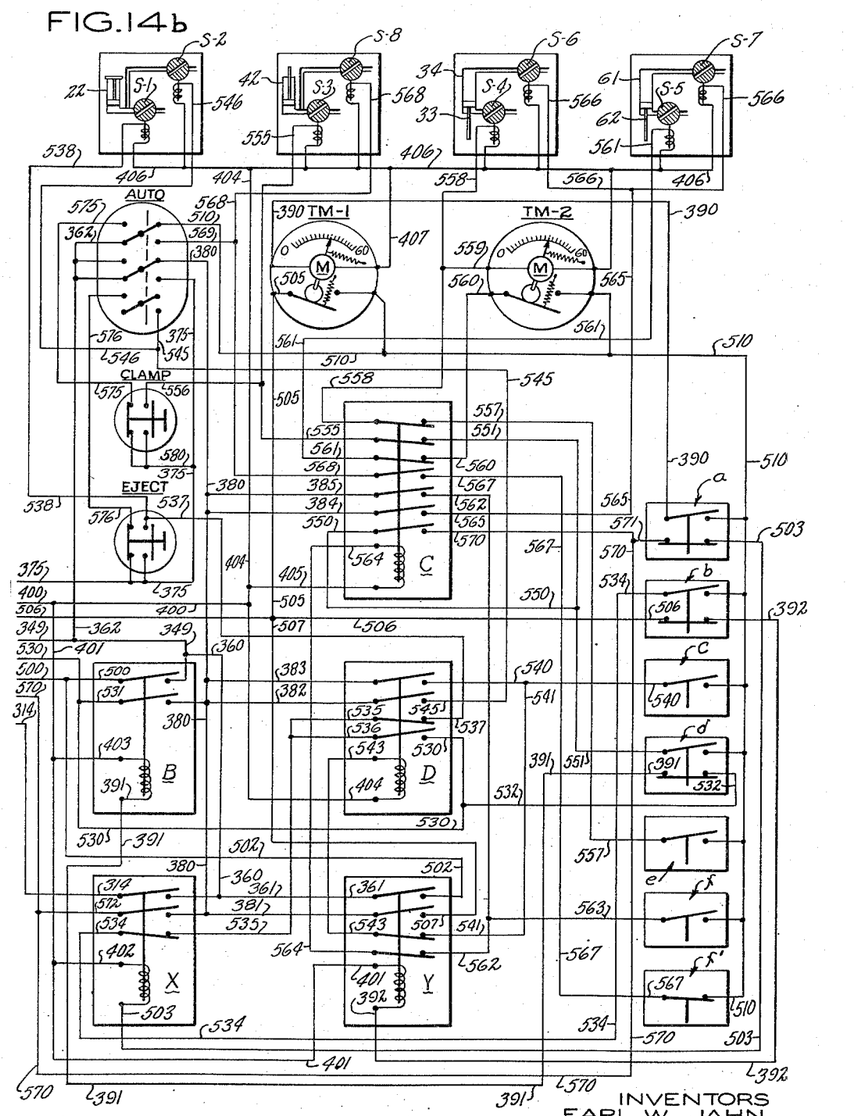

Figs. 14a and 14b disclose a wiring diagram for the apparatus. It will be understood that the controls for various circuits may be individually actuated by manually operable push button switches, as for testing any of the various functioning parts of the machine, or the machine may be placed on automatic cycle to carry out the sequence of operations for the successive automatic production of shells.

In the diagram the various push button switches are indicated by an appropriate legend. On Fig. 14a the "start" and "stop" push button switches are self-explanatory as to function. "Oven," "Center" and "Invest" are for movement of the pattern carriage on the track to its positions at station B, station C and station A respectively. On Fig. 14b "Clamp" designates the push button switch for raising track section 5 upwardly toward the investment chamber 4 at station A. "Eject" is the push button switch for raising the platen 134 at station C. The switch bearing the legend "Auto" represents a selector switch for manually shifting the circuits from an automatic operational position to one in which the previously mentioned push button switches may be placed in the circuits for individual operation.

Also bearing legends are the following on Fig. 14: the thermal element associated with the bottom heaters 181 to control the temperature thereof designated as "Therm"; the lamp designated as "Pilot" to indicate whether the circuit is energized for operation; and the percentage heat input timer as "PTM" for additional regulation of the heaters in the oven to maintain a more even temperature. On Fig. 14b the timer for regulation of the oven timing cycle is designated as "TM–1," the timer for the investment timing cycle before inverting chamber 4 is designated "TM–2."

The elements bearing legends on Figs. 14a and 14b are located on the face of the control panel 186 as in Fig. 2. In addition a thermocouple dial as 187 on the panel is provided to indicate the temperature of a pattern at the ejection station C. A flexible cable 188 is hung on the panel with thermal elements for contacting the pattern surface and suitably connected to register the temperature of the pattern on the dial 188. Thus, before starting the machine for production of shells the operator may accurately determine the initial pattern temperature. Once a suitably pre-heated pattern is placed in the machine for operation the desired body temperature thereof will be satisfactorily maintained by the successive curing cycles in the oven during automatic production of shells.

Again referring to the wiring diagram wires 251, 252, and 253 as from a suitable three phase source are connected to a set of normally open contacts of the coil of a relay H and a set of normally open contacts of the coil of a relay E. Relays H and E respectively control the circuits of the top oven heater 180 and of the lower oven heater 181 as shown. The control for these relays will be later described.

The wires 251 and 253 are also connected to normally open contacts of the coil of a relay L and normally open contacts of the coil of a relay R. Relay L controls the operation of the motor 82 for propelling the pattern carriage to the left as seen in Fig. 2 and relay R controls the movement thereof in the reverse direction as to the right. Wire 252 is connected directly to the motor circuit as shown. Wire 251 may be connected by the contact of relay R to a wire 254 and by the contact of relay L to a wire 255. Wire 253 may be connected by the contact of relay R as to a wire 256 and by the contact of relay L as to a wire 257. Wires 254 and 257 are joined and connected by a wire 258 to the motor 82. Wires 255 and 256 are also joined and connected by a wire 257 to the motor 82. The relays R and L are controlled as will be later described.

Connected across one phase of the supply wires as shown is a transformer 260. Wires 261 and 262 are connected to the transformer, the latter of which may be suitably grounded. Wire 261 is connected as shown as by a wire 271 to each of a pair of normally open contacts of a starting relay A. Wire 261 is also connected to the "Start" switch (by wire 281) and to a normally open contact of the "Stop" switch (by wire 291).

The other terminal of the "Start" switch is connected back to wire 261 through the upper contacts of relay A by wires 263 and 273. It is also connected to the coil of relay A by wire 273, normally closed contacts of the "Stop" switch, and wires 274 and 284. The coil is connected by wire 272 to wire 262. The "Pilot" may be connected across wires 274 and 262, as shown, for indicating whether the starting coil of relay A is energized. When the "Start" switch is connected, the coil of relay A is energized through the closed switch across wires 273 and 274 to hold the contacts closed across wires 271 and 273. The latter circuit will remain closed until the "Stop" switch is actuated to break the contact between wires 273 and 274.

The other contacts of relay A establish a connection from wire 271 to a wire 265 connected through normally closed contacts of the "Stop" switch to wire 293, wire 303 and to a movable switch blade 313 of a plugging switch 294. The blade 313 is also connected by wire 303 to the normally open switch contact of the "Stop" switch for connection to wire 261 (by wire 291) when the "Stop" switch is operated.

The plugging switch is electrically interlocked with the relays R and L operating the motor drive. It is driven by the motor through a shaft connection as designated at 82' for connecting in the usual fashion wire 303 to a wire 304 across the switch 313 when the motor is energized through relay R, and for connecting wire 303 to a wire 500 across switch 313 and a wire 501 when relay L is energized.

Wire 304 to the plugging switch is connected to a wire 314 leading to normally closed contacts of relay R and through said contacts to wire 343 of the coil of relay L. The coil of relay L is connected by a wire 316 (as is the coil of relay R also connected to wire 316), to return wire 262 by wires 317, 302 and 305.

Wire 501 to the plugging switch is connected by wire 500 across normally closed contacts of relay L to the coil of relay R by a wire 344.

Wires 500 and 314 are connected to the holding contacts of relays shown by Fig. 14b as will be described.

When energized relay R will energize the motor for a right hand drive of the pattern carriage as described. A circuit is thus established through wires 303, switch 313 of the plugging switch and wires 304 and 314 to the now open upper switch of relay R. This switch as explained is connected to the coil of relay L by wire 343. When the "Stop" button is actuated to drop out relay A, and drop out holding contacts (of Fig. 14b) controlling the circuit to wire 500, and to connect wire 303 directly to the transformer wire 261 (by wire 291), or the circuit to relay R (connected by wire 344 to wire 500) is otherwise broken by the holding contacts controlling said circuits to wire 500, the coil of relay R is deenergized to break the circuit to the motor through relay R. The switch across wires 314 and 343 to the coil of relay L is, however, then closed and energizes relay L to quickly reverse the direction of the motor so as to stop the chain drive abruptly and "plug" the motor. As the motor is reversed the switch blade 313 of the plugging switch 294 breaks its connection across to line 304 and immediately drops out relay L to completely deenergize the motor. The switch blade 313 is inactive until the motor is again operated to drive the plugging switch 294 in either direction.

It will be apparent that when relay L is to be deenergized after driving the motor, switch blade 313 then connects wire 303 with wire 500 (by wire 501) and the coil of relay R through wire 344 so as to operate in similar fashion and abruptly "plug" the motor and stop carriage travel to the left.

The coil of relay E is connected to the return line 262 through wires 302 and 305. The coil of relay H is connected to wire 302 by a wire 342 and also to normally open holding contacts of relay E by a wire 345 and thence to a wire 346 to the switch of the percentage input timer "PTM." The timer switch is connected to the transformer line 261 by wires 347, 348, 349, 350, and 265 through the switch of relay A. Wire 349 is also connected to the thermally operated switch as the bellows switch of the temperature control member "Therm," the switch of the latter being connected by a wire 351 to the coil of relay E.

The thermal switch may be controlled as by the element at 352 connected to the bellows as shown and to call for heat input as required.

The motor for the percentage timer "PTM" is operated as shown by the circuit through wires 348 and 305. An adjustable pointer as 353 is shown to designate a means for setting the timer as for a certain number of seconds in each minute during which the spring urged switch is permitted to energize the coil of relay H by wires 346 and 345, provided the coil of relay E is energized by the thermal switch means. The time dwell of the eccentric cam wheel operating the switch may be varied by movement of the motor shaft as schematically indicated.

The return wire 305 to wire 262 is connected to the circuits of Fig. 14b by a wire 400.

On Fig. 14b the limit switches a, b, c, d, e, and f—f' are indicated on the right hand side of the drawing. The location thereof on the machine and the means for actuating the same has been previously described.

At the top of the drawing the four cylinders of the machine and solenoid operated valves for controlling the same are diagrammatically shown. The valves are designated S-1 through S-8, inclusive, the numeral sequence thereof indicating the order in which the valves are operated during an automatic cycle commencing with the pattern carriage located in the oven at station B.

In Fig. 14b the "Auto" selector switch is indicated with the switches thereof closed for automatic operation. With the carriage in the oven the limit switch a is actuated and closes the contacts for a circuit from wire 390 across to wire 510. Wire 510 is connected to the transformer line 261 by a closed "Auto" switch, wires 362, 349, and 350, the closed contacts of relay A, and wire 271. Wire 390 is connected to return line 262 through the motor of timer "TM-1," wires 407, 406, 404, 400 and 305. Thus the timing motor is energized. The oven timer "TM-1," as schematically shown, rotates a cam to turn the same for closing the switch thereof as the pointer, simultaneously operated by the motor, returns to a zero reading. At the end of a timing cycle a circuit is closed from wire 510 to wire 505 to operate the motor relay R as will be presently described. When the circuit to the motor is opened by movement of the pattern carriage to cut limit switch a out of circuit the cam is returned to the position shown as by a spring arrangement on the dial setting. The timer "TM-2" may be of a similar type. Each of the timers may be set for a predetermined period, the oven timer for example, at approximately forty seconds.

At the end of the cycle of "TM-1" the circuit between wire 510 and 505 is closed, wire 510 being connected to the transformer line 261 as described. The circuit through wire 505 energizes the coil of relay Y by connection to the return line 262 through wire 506, the closed contacts of limit switch b, a wire 392, the coil of relay Y, and wires 401, 400, and 305.

When relay Y closes, the uppermost contacts thereof between wires 361 and 502 are closed to the motor relay R. Wire 502 is connected by wire 500, the closed contacts of relay L and wire 344 to the coil of relay R and thence by wires 316 and 317 to the return line 262. Wire 361 is connected to the transformer line 261 by wires 361, 360, 349, 350, and the closed contacts of relay A.

Holding contacts to the coil of relay Y around the switch of "TM-1" are closed between wires 381 and 507. Wire 507 is connected by wire 506, the closed contacts of switch b, and wire 392 to the coil of relay Y; wire 381 is connected by wire 380, across the "Auto" switch, to wires 362, 349, 348, 305, 400 and 401 to the coil of relay Y.

The motor as previously described thus propels the carriage to the ejection station to operate limit switch b. The contacts across wires 392 and 506 at switch b are opened to cut relay Y out of circuit and thus break the circuit to wires 502 and 500 which as previously described stops the motor abruptly.

The other set of contacts on switch b are closed to energize solenoid valve S-1 by connecting wires 510 and 534. Wire 510 as previously described is connected to transformer wire 261. Wire 534 is connected to the return line 262 by closed contacts of relay X, wire 535, closed contacts of relay D, wires 537 and 538, solenoid S-1, wires 406, 404, 400 and 305.

As indicated energizing valve S-1 raises the platen of cylinder 22. As limit switch c is then actuated, as previously described at the ejection station, contacts are closed across wires 510 and 540. Wire 510, as described previously, is connected to transformer line 261. Wire 540 picks up relay D in the circuit by connection through wire 541, the now closed contacts of relay Y to wire 543, the coil of relay D and wires 404, 400, 305 and return wire 262.

Relay D opens the connection to the solenoid of valve S-1 by breaking the contacts between wires 535 and 537. Holding contacts are also closed for relay D around the solenoid S-1 between wires 383 and 540. Wire 383 is connected to wire 380, by the "Auto" switch to wires 362, 349, 348, 305, 400 and 404 to the coil of relay D. Wire 540 is connected by wire 541, closed contacts of relay Y, and wire 543 to the coil of relay D.

Relay D also closes the contacts between wires 530 and 536 which makes it possible for the circuit to relay B to close after subsequent operations as will be described. The contacts for a circuit through wires 545 and 382 is also established for operation of solenoid valve S-2. Wire 545 through wire 546 is connected to the solenoid S-2 and thence to the return wires 406, 404, 400, 305. Wire 382 is connected to wire 380 and thence back to the transformer line 261 as described.

Valve S-2 releases air from the cylinder and as the platen is lowered limit switch b is operated again to close the contacts between wires 534 and 510. Closing this circuit at this time lets relay B close by reason of the closed contacts of relay D between wires 530 and 536. The circuit to solenoid S-1 is not closed by reason of the open contacts of relay D between wires 535 and 537.

The circuit from wire 534 of switch b is by wires 535 (through relay X) 536, and wires 530 (through relay D) and 532 to closed contacts of limit switch d, wire 391 to the coil of relay B. From the coil of relay B wires 403, 401, and 400 lead to the return wire 262.

The closing of relay B closes holding contacts between wires 531 and 382. Wire 531 by wires 530, 532, the closed switch of limit switch d and wire 391 to the coil of relay B. Wire 382 leads to the transformer line 261 as previously described through the "Auto" switch. Relay B also closes contacts between wires 500 and 349 which as previously traced for the contacts between wires 361 and 502 of relay Y operates the motor through energizing relay R.

The pattern carriage then operates limit switch d on arrival of the carriage at the investment station. The contacts at switch d between wires 391 and 532 are opened to drop out the coil of relay B and stop the motor. Switch d also closes the circuit between wires 510 and 551 which energizes the solenoid of valve S-3, wire 551 across closed contacts of relay C being connected to the solenoid S-3 by a wire 555. Air enters cylinder 42 and the clamping elevator is raised to clamp the pattern against the investment chamber 4.

In the raised position of the elevator the limit switch e is operated to establish a connection across its contacts between wire 510 and wire 557. This energizes the solenoid valve S-4, wire 557 being connected thereto through closed contacts of relay C by a wire 558. Operation of solenoid S-4 retracts the piston rod 33 of cylinder 34 to open the gate 18 and thus deposit the mass of sand-resin mix on the pattern. The closing of the contacts of limit switch e also starts the investment timer "TM-2" by reason of the wire 558 being connected to the motor of the timer by a wire 559. The motor as shown is connected to the wire 406 in circuit with the return wire 262. The thickness of a shell is determined by the investment timing period which allows the sand and resin to partially set on the face of the pattern.

After the timing operation the timer closes contacts across to wire 510 and to the solenoid of valve S-5 by its connection through wire 560, closed contacts of relay C and wire 561. Solenoid valve S-5 operates the cylinder 61 to invert the chamber and pattern carriage to drop the excess sand-resin mix from the partially formed shell adhering to the pattern surface.

When the chamber has reached the limit of rotation, limit switches f and f' are actuated. Switch f closes its normally open contacts and f' opens its normally closed contacts. Switch f closes a circuit from wire 510 to a wire 563 which energizes the coil of relay C (wire 563, 562, closed contacts of relay Y and wire 564). The coil is connected to the intermediate return wire 404 by a wire 405. The closing of relay C closes four normally open sets of contacts and opens three normally closed sets of contacts.

(a) Holding contacts around limit switch f between wires 562 and 385 are closed. Wire 385 is connected to wire 380 which as previously described is connected back to the transformer wire 261. Wire 562 is connected to the coil of relay C through the closed contacts of relay Y to wire 564.

(b) The clamp circuit of switch d through the normally closed contacts between wires 551 and 555 is opened. However, the clamping position is maintained since air pressure is not released from the cylinder 42.

(c) The circuit between wires 550 and 570 is closed which makes it possible for the circuit to the coil of relay X to close at a later operation. Wire 550 is connected by wire 551 to the opened contacts of switch d leading to wire 510. The wire 570 is connected by wire 571 and the normally closed contacts of limit switch a to the wire 503 connected to the coil of relay X.

(d) The circuit to the solenoid valve S-4 through wires 557 and 558 is opened to de-energize the valve S-4. However, the gate 18 controlled by the cylinder remains open by reason of air pressure remaining in the cylinder. Opening of this circuit also recycles the timer "TM-2."

(e) The contacts between wires 560 and 561 are open which de-energizes the solenoid of valve S-5. However, the cylinder 61 does not operate to rotate the chamber to upright position since air is not released from the cylinder.

(f) The contacts between wires 567 and 568 are closed to prepare for the eventual operation of solenoid valve S-8 when the chamber is rotated to upright position and the limit switch f' is again actuated.

(g) Relay C also closes the contacts between wires 384 and 565 which energizes solenoid valves S-6 and S-7. Valve S-6 closes gate 18 and valve S-7 reversely rotates the investment chamber to upright position. Wire 384 is connected by wire 380 into the "Auto" switch and to the transformer line 262 as previously described. Wire 565 is connected by wire 566 to both solenoids. The valves S-6 and S-7 admit air pressure to the other side of the pistons. The chamber is thus carried back to its normal upright position with the excess mix in the upper compartment thereof.

On the chamber returning to the upright position with the piston of cylinder 61 again extended, limit switch f and f' are again operated first to open the circuit between wires 563 and 510 and next to close the circuit between wires 567 and 510. Closing the latter circuit energizes solenoid valve S-8 across the contacts of relay C between wires 567 and 568. Operation of valve S-8 allows air to be discharged from the clamping cylinder 42 and the pattern carriage returns to its "track" position.

When the pattern carriage returns to track position limit switch d is again operated closing the contacts across wires 510 and 551 and energizing relay X through wires 550, 570 (through relay C), wire 571, limit switch a and wire 503.

Relay X closes contacts across wires 361 and 314, wire 314 leading to the coil of relay L of the motor as previously described. This starts the motor propelling the pattern to the oven.

Relay X also opens the contacts between wires 534 and 535 thus interrupting the circuit through wire 534 to limit switch b to take the same out of circuit while the pattern is being propelled to the oven and trips the actuator mechanism thereof.

When the pattern in the oven operates limit switch a to recommence the cycle of operation contacts across limit switch a between wires 571 and 503 are opened to cut relay X out of the circuit and stop the motor.

It is to be noted that after the first cycle relay C and relay D are de-energized after the timing cycle by operation of relay Y. Relay Y breaks the circuit to the coils of relays C and D by opening the circuit to wires 564 and 543, respectively.

For individual operation of the push button switches the "Auto" switch is operated to separate the contacts shown as in Fig. 14b and to establish connections between wires 575 and 569, wires 362 and 375, and wires 545 and 576.

The connection between wires 362 and 375 establishes a circuit to the transformer wire 261 for all push button switches. Wire 362 as previously described is connected to wire 261 by wires 349, 350, and relay A to wire 271. Wire 375 is connected by wire 580 to "Clamp"; by terminal wires as shown to "Eject"; by wire 576 (Fig. 14a) to "Invest" and "Oven"; and by wires 376 and 377 to "Center."

The "Oven" switch establishes a circuit to the coil of relay X by wire 570 to wire 571 across closed contacts of limit switch a to wire 503. Accordingly relay L for left hand movement of the carriage may be individually accomplished.

The "Center" switch by wire 506 connects the coil of relay Y through the closed contacts of limit switch b to wire 392 of said coil. This operates relay R for right hand movement of the carriage.

The "Invest" switch by wire 530, wire 532, limit switch d and wire 391 energizes relay B for connecting relay R in the circuit and carriage movement to station A.

The "Clamp" switch is connected by wire 556 to wire 555 for operation of the solenoid of valve S-2. It also open contacts for the circuit between wires 580 and 575 which is connected through the "Auto" switch to wires 569 and 568 to the solenoid of valve S-8. Accordingly when the "Clamp" switch is operated to open valve S-3 and operate the cylinder 42, valve S-8 for exhausting the same will be actuated on release of the "Clamp" switch.

The "Eject" switch is connected by wire 538 for operation of the solenoid of valve S-1. The contacts between wires 375 and 576 are opened. Wire 576 is connected through the "Auto" switch to wires 545 and 546 to the valve S-2 which operates to exhaust cylinder 22 when the "Eject" switch is released.

*Features of investing operation*

A principal feature of novelty embodied in the structure herein disclosed is to be found in the manner in which the pattern surface is invested at station A with the mass of sand-resin mix. From a consideration in particular of Fig. 3 it will be appreciated that a mass of sand-resin mix sufficient for a plurality of shells is normally held in the storage reservoir of the upper compartment 16. The gate 18 as previously noted is arcuately formed with the curved side edges thereof slidably held against the side walls of the chamber 4. The inner end edge of the gate in closed position is disposed against the rear wall at a lower elevation vertically than the outer end edge which extends through the louvred opening of the front wall of the chamber. The concave surface of the gate faces the upper compartment with the radial center of the arc formed thereby located at the pivotal axis of the lever arms 30.

Thus on slidably withdrawing gate 18 the mass of investing material held in compartment 16 is dropped progressively and uniformly across the pattern surface from one end to the other as from the rear wall of the chamber across to the front wall. The pattern surface is accordingly blanketed evenly and surely by a vertically falling mass of dry comminuated sand-resin mix progressively advancing across the pattern surface. In this manner no air pockets will be formed on a pattern surface and arching, voids and porosity in the shells are effectively eliminated. A dense shell is assured with the corners of the pattern image sharply and precisely defined in the cured shell.

Insofar as we are aware the method of dropping the mass of dry sand-resin mix on the pattern surface as herein described is completely novel and superior to any of the various methods heretofore suggested or inherent in apparatus described for coating a pattern surface.

It is also to be noted on completion of the "setting" time for forming a shell coating the chamber 4 is rotated approximately 210° as to the position of Fig. 4. It will be appreciated that excess investing material will roll off the semi-cured coating formed on the pattern surface—as against the rear wall of the chamber and then into the top compartment 16 during rotation of the chamber. By rotation of the chamber beyond 180°, and as will be realized from the position of Fig. 4, a returning mass of sand-resin mix will tend to settle toward the inverted upper fore corner of the chamber. Since dry sand pours or rolls at an angle of approximately 30° the rotation of the chamber to approximately 210° thus causes the mass of excess mix to be evenly distributed with relation to the inverted top wall of the chamber. The insertion of the gate to closed position for full recovery of excess mix in the compartment 16 is thus assured. Were the chamber rotated but 180°, a portion of the excesss and rolling against the rear wall thereof would be cut by the closing of the gate to fall against the coated pattern on return of the chamber to upright position.

What is claimed is:

1. In shell mold making apparatus, in combination, a rotatably mounted investment chamber having cable operated mechanism for pivoting said chamber between inverted and upright positions, a gate dividing said chamber into an upper storage compartment and a lower investing compartment, said latter compartment having an open bottom with said upper compartment being adapted to contain a supply of comminuted shell mold investment material therein and said gate formed as an arcuate apron extending across said chamber, means to move said gate across said chamber to open and closed positions for vertically dropping said material on the surface of a mold pattern at said bottom in upright position of the chamber and for recovering excess material therefrom when said chamber is rotated to inverted position, a mold pattern having means on the underside thereof engageable to lift a cured shell mold above the pattern surface and a wheeled carrier frame supporting said pattern in fixed relation, said chamber having elevating means providing a section of track adapted to support said pattern carrier underneath the open bottom of said chamber and operable to clamp a carrier with its pattern against the same, a stationary conveyor track aligned with said track section in lower position of the latter with a curing oven enclosing the outer end of said track in spaced relation to said chamber, a shell ejection cylinder positioned between said chamber and curing oven having a platen located under the track for vertical movement above track level with means adjacent the track for sliding engagement with said carrier to prevent upward movement thereof, means engageable with said carriage below said chamber at track level for imparting movement to said carrier for passage of the same to said oven and ejection cylinder, electric circuit controlled operating means for propelling said carrier along said track including positional switch means engaged by the carrier for stopping said carrier at said locations and respectively operating a timing cycle at said oven for curing a shell deposited on the pattern and at the end of the cycle imparting reverse travel toward said ejection cylinder, and at said cylinder elevating said cylinder to lift the shell from the pattern surface and on the downstroke of the cylinder to impart travel toward said chamber, a positional switch operable on return of the carrier below the chamber to actuate said clamping means, and positional switch means associated with said chamber and inverting mechanism for successively opening the gate, holding said carrier horizontally clamped for a timed interval, inverting said chamber, closing the gate and returning the chamber to upright position for release of said clamping means.

2. In shell mold making apparatus, in combination, an investment chamber having an open bottom and storage means in the upper portion thereof for releasing a mass of comminuted investment material on a pattern clamped against said open bottom and the recovery of excess material therein by inverting said chamber, said chamber being mounted on journaled supporting members affixed to opposite sides thereof, chamber pivoting means including cables oppositely looped over one of said members and carried with the cables fixed thereto, guide pulleys arranged at one side of said member and spaced from each other, each pulley receiving one of said cables looped over the outer side thereof and anchored beyond the same, an actuator pulley mounted for reciprocating between said guide pulleys and receiving said cables looped around opposite sides of the same to draw said cables for rotation of said chamber respectively to inverted and upright positions.

3. In shell mold making apparatus, in combination, an investment chamber having releasable storage means to drop a mass of comminuted investment material on a pattern clamped thereto, and the recovery of excess material upon inverting said chamber, a journaled mounting supporting said chamber including a pulley wheel carried in fixed relation to said chamber, cables fixed to said wheel and looped in opposite directions around the same, guide pulleys spaced from said wheel and mounted in oppositely spaced relation to each other, each receiving one of said oppositely looped cables on the outer side thereof, a pulley having means to reciprocate the same between said guide pulleys and having said cables looped around the same for alternately drawing and releasing each of said cables for the reversible rotation of said wheel and chamber.

4. In shell mold making apparatus, in combination, a rotatably mounted investment chamber having pivoting mechanism for rotating said chamber between vertically upright and inverted inclined positions through an arc on the order of 210°, a gate dividing said chamber into an upper storage compartment and a lower investing compartment, said latter compartment having an open bottom with said upper compartment being adapted to contain a supply of comminuted shell mold investment material therein and said gate being formed as an arcuate apron extending across said chamber and having a free end disposed at a lower elevation than its opposite end, means fixed to said opposite end to move said gate across said chamber to open and close positions for vertically dropping said material on the surface of a mold pattern at said bottom in upright position of the chamber and for recovering excess material therefrom when said chamber is rotated to its said inverted position, a mold pattern and a supporting frame carrying said pattern fixed thereto, said chamber having elevating means to support said pattern frame underneath the open bottom of said chamber and operable to clamp said frame with its pattern against the same, electric circuit controlled operating means including a switch for actuating said clamping means and positional switch means associated with said chamber and inverting mechanism operable upon movement of said clamping means for successively opening the gate, holding said frame horizontally clamped for a time interval, inverting said chamber, closing the gate and returning the chamber to upright position for release of said clamping means.

5. In shell mold making apparatus an investment chamber provided with an opening in the bottom wall thereof and means for clamping a mold pattern against said opening, said chamber being rotatable from a vertical upright position to an inclined inverted position through an arc on the order of 210°, and having reversible inverting means for rotation of said chamber between said positions, an arcuately formed gate in said chamber dividing the same into upper and lower compartments with the concave side of the gate facing upwardly to hold a mass of investment material in said upper compartment, and withdrawing means attached to one end of the gate, said gate having an opposite free end adapted to lie at a vertically lower elevation relative to said attached end in upright position of said chamber and to spread investment material progressively from one side to the other across a mold pattern on withdrawal of said gate, the chamber rotation to inverted position being in the direction of withdrawal of said attached end of the gate and said inclined inverted position of the chamber enabling full recovery by said gate of excess material falling from a pattern invested by said material.

6. The structure of claim 5 in which said gate withdrawing means comprises a pair of arms pivotally mounted in the outer side walls of said chamber with the outer ends of the arms affixed to said attached end of the gate, and the radial center of said arcuate gate is at the pivotal axis of said arms.

References Cited in the file of this patent

UNITED STATES PATENTS

| | | |
|---|---|---|
| 1,726,025 | Harmes | Aug. 27, 1929 |
| 2,626,053 | McIlvanine | Jan. 20, 1953 |
| 2,651,087 | Fellows | Sept. 8, 1953 |
| 2,659,944 | Valyi | Nov. 24, 1953 |
| 2,695,431 | Davis | Nov. 30, 1954 |
| 2,724,158 | Davis | Nov. 22, 1955 |

OTHER REFERENCES

Foundry, November 1952, page 265.
Foundry, September 1952, pages 95–97, 108–111.
The Iron Age, vol. 169, issue 20, pages 109–113.
Fortune, July 1952, pages 104–106, 140 and 143.